(12) United States Patent
Pajerski et al.

(10) Patent No.: US 8,568,889 B2
(45) Date of Patent: Oct. 29, 2013

(54) AQUEOUS POLYMER COMPOSITIONS OBTAINED FROM EPOXIDIZED NATURAL OILS

(75) Inventors: Anthony D. Pajerski, Broadview Heights, OH (US); Svetlana N. Lerner, Solon, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 172 days.

(21) Appl. No.: 12/918,216

(22) PCT Filed: Feb. 16, 2009

(86) PCT No.: PCT/US2009/034203
§ 371 (c)(1),
(2), (4) Date: Aug. 18, 2010

(87) PCT Pub. No.: WO2009/105400
PCT Pub. Date: Aug. 27, 2009

(65) Prior Publication Data
US 2010/0330375 A1  Dec. 30, 2010

Related U.S. Application Data

(60) Provisional application No. 61/029,664, filed on Feb. 19, 2008.

(51) Int. Cl.
*B32B 27/40* (2006.01)
*C08L 75/04* (2006.01)
*C08G 18/08* (2006.01)

(52) U.S. Cl.
USPC ............ 428/423.1; 428/425.1; 524/590; 524/591; 525/453

(58) Field of Classification Search
USPC ............ 428/425.1, 423.1; 524/590, 591, 589; 525/453
See application file for complete search history.

(56) References Cited

U.S. PATENT DOCUMENTS

| | | | |
|---|---|---|---|
| 7,476,705 B2 * | 1/2009 | Pajerski | 524/591 |
| 7,576,157 B2 * | 8/2009 | Pajerski | 524/589 |
| 2006/0264568 A1 * | 11/2006 | Pajerski | 524/591 |
| 2008/0027168 A1 * | 1/2008 | Pajerski | 524/591 |
| 2009/0137734 A1 * | 5/2009 | Pajerski | 524/591 |
| 2011/0009561 A1 * | 1/2011 | Pajerski et al. | 524/591 |

FOREIGN PATENT DOCUMENTS

| | | |
|---|---|---|
| WO | 2006/047746 A1 | 5/2006 |
| WO | 2008/016843 A1 | 2/2008 |

* cited by examiner

*Primary Examiner* — Thao T. Tran
(74) *Attorney, Agent, or Firm* — Samuel B. Laferty

(57) ABSTRACT

Aqueous polyurethane dispersions are made from urethane prepolymers comprising one or more polyhydroxy compounds from ketone functional molecules derived from an epoxidized natural oil. Addition of a hydrazine functional moiety to the prepolymer dispersion can further provide a crosslinking mechanism resulting in the formation of azomethine linkages in the resulting polyurethane during drying. When the ketone functional molecule is derived from levulinic acid and epoxidized vegetable oil, the resulting urethane dispersion can also be converted into a hybrid polyurethane-vinyl dispersion by adding and polymerizing one or more vinyl monomers in the polyurethane prepolymer or polyurethane dispersion.

13 Claims, No Drawings

AQUEOUS POLYMER COMPOSITIONS OBTAINED FROM EPOXIDIZED NATURAL OILS

CROSS REFERENCE TO RELATED APPLICATION

This application claims priority from PCT Application Ser. No. PCT/US2009/34203 filed on Feb. 16, 2009, which claims the benefit of U.S. Provisional Application No. 61/029,664 filed on Feb. 19, 2008.

FIELD OF THE INVENTION

This invention relates to compositions of aqueous polyurethane dispersions which contain a high renewable resource content, good color stability and fast room temperature self-crosslinking. The crosslinking is obtained from co-reaction of a ketone functional moiety and a hydrazine/hydrazide functional moiety which provides excellent final coating properties useful in applications such as wood flooring. Moreover, the invention can be formulated at low or reduced volatile organic content which furthers its environmentally friendly appeal.

BACKGROUND OF THE INVENTION

Waterborne polyurethane dispersions are well known in the coatings industry for their unique and strong performance properties including solvent and chemical resistance, mar and scuff resistance, excellent abrasion resistance, low temperature flexibility and good adhesion to a variety of substrates. However, for certain applications such as wood flooring, crosslinking of the polyurethane is needed to obtain the necessary performance requirements.

Current and future trends in performance coatings are centered on environmentally friendly or responsible polymer types that are based on more sustainable raw materials (by containing a high content of raw materials based on renewable resources) and can form coalesced films at low or reduced emissions of volatile organic compounds (reduced environmental impact). Waterborne polymers can offer improvements in reducing the level of volatile organic compounds released during film formation but they typically are based mainly on petroleum derived raw materials or lack the performance needed in certain applications such as wood flooring. This would be particularly true for one component self-crosslinking compositions which are more user friendly due to reduced toxicity concerns and more environmentally friendly due to less waste generated compared to more conventional two component crosslinked systems.

U.S. Pat. Nos. 4,066,591 and 4,147,679 disclose the preparation of waterborne polyurethane dispersions which contain unsaturated functional groups capable of undergoing auto-oxidative crosslinking.

U.S. Pat. No. 4,598,121 disclosed a method for preparing an, aqueous polyurethane dispersion, comprising (a) preparing a prepolymer with free NCO groups by reacting an aliphatic or cycloaliphatic polyisocyanate with a polyol, and an anionic compound; (b) dispersing said prepolymer in water; (c) reacting said water-dispersed prepolymer with a diamino hydrazide as a chain lengthening agent; and (d) reacting the prepolymer of step (e) in said dispersion with formaldehyde to effect crosslinking.

U.S. Pat. No. 4,983,662 disclosed an aqueous self crosslinkable coating composition comprising an aqueous dispersion of at least one polyurethane and having hydrazine (or hydrazone) functional groups and carbonyl functional groups disposed therein to provide a self crosslinking reaction, in which the polyurethane polymer takes part, via azomethine formation during and/or after film formation.

U.S. Pat. No. 5,070,136 disclosed an aqueous polymer dispersions essentially containing a copolymer of a) from 85 to 98.5% by weight of methacrylates, b) from 0.5 to 4% by weight of acrylic acid and/or methacrylic acid, c) from 0.5 to 4% by weight of acrylamide and/or methacrylamide, d) from 0.5 to 4% by weight of an $\alpha,\beta$-ethylenically di-unsaturated or polyunsaturated compound and e) from 0 to 3% by weight of a carbonyl-containing $\alpha,\beta$-ethylenically unsaturated compound, a process for their preparation, and their use for coating wood.

U.S. Pat. No. 5,141,983 disclosed a ketone-hydrazide crosslinking technology where the ketone, or carbonyl group resides on an acrylic polymer and a polyurethane polymer contains hydrazide functional groups. The composition is obtained by polymerizing the acrylic monomers in the presence of an aqueous polyurethane dispersion U.S. Pat. Nos. 5,571,861 and 5,623,016 disclosed an aqueous, self-crosslinking polymer dispersion binder(s) comprising polyhydrazides and carbonyl-containing polyurethane-vinyl hybrid polymers and also, if desired, conventional additives are useful in base coatings, aqueous coatings, adhesives and printing inks.

U.S. Pat. No. 6,063,861 disclosed a storage stable, aqueous polyurethane-polyacrylate hybrid dispersions, which are self crosslinkable at room temperature and contain A) 10 to 95 wt. %, of a polyurethane dispersion, B) 5 to 90 wt. %, of a polymer prepared in the presence of component A) from a mixture of vinyl monomers containing 0.5 to 20 wt. %, based on the total resin solids content of the hybrid dispersion, of a vinyl monomer containing acetoacetoxy groups, and C) an at least difunctional primary or secondary amine, which is present in an equivalent ratio of amino groups to acetoacetoxy groups of 0.5:1 to 1.1:1, in which the wt. % of components A) and B) add up to 100, based on the total weight of components A) and B).

U.S. Pat. No. 6,239,209 disclosed waterborne urethane-acrylic compositions which are auto-oxidatively crosslinkable. In one embodiment, the composition also contains ketone hydrazide type self-crosslinking where the ketone/carbonyl is introduced via the acrylic and the hydrazide functionality is contained on the polyurethane along with the unsaturated oxidatively curable functional groups.

U.S. Pat. No. 6,576,702 disclosed waterborne polyurethane dispersions are prepared by reacting (1) at least one polyisocyanate; (2) at least one active hydrogen containing compound, such as a polyol or a polyamide; and (3) preferably also at least one water-dispersibility enhancing compound having water-dispersion enhancing groups, in order to form an isocyanate terminated prepolymer. The prepolymer subsequently is (1) optionally neutralized by reaction with at least one neutralizing agent, (2) dispersed in water, and then (3) chain extended by reaction with at least one of water, inorganic or organic polyamine having an average of about 2 or more primary and/or secondary amine groups, or combinations thereof. At least one plasticizer is introduced into the reaction mixture at any time during prepolymer formation or before the prepolymer is dispersed in water. The plasticizer substantially or completely replaces other organic diluents or solvents. Various types of plasticizers may be employed, including reactive plasticizers.

SUMMARY OF THE INVENTION

We have discovered novel aqueous polyurethane compositions and in certain embodiments, polyurethane-acrylic compositions which surprisingly can provide a clean high quality dispersion (low in sediment) that can quickly self-crosslink at ambient or low temperatures, that are storage stable, have good color stability, which can be formulated with a low volatile organic component content and use significant amounts of renewable raw materials as building blocks.

The main building block of the said waterborne polyurethane and urethane-acrylic dispersions is a poly-ketone polyol obtained from the reaction of levulinic acid with epoxidized or epoxy functional natural oils such as epoxidized soybean, oil and epoxidized linseed oil; both of which can be obtained from or have high renewable content. Alternatively, veronica oil can be used, which is a naturally occurring oil that contains epoxy functional groups. It is well documented that levulinic acid is a significant renewable raw material which can be obtained from biomass in the so called "Biofine Process". Epoxidized oils from soybean and linseed oil are well know commercially available and economical materials commonly used as both plasticizer and stabilizer for polyvinyl chloride. Epoxidized oils are commonly obtained by the reaction of peracids such as peracetic acid on unsaturated oils such as soybean and linseed which converts most of the unsaturated groups to epoxy or oxirane rings. Of course, the natural oils are derived from a renewable resource and peracetic acid can be obtained from the reaction of acetic acid with hydrogen peroxide both of which can be obtained from renewable raw materials. Acetic acid can be obtained from the well know process of bacterial fermentation. Hydrogen peroxide is obtained in a series of reactions where the chemical balance amounts to the combination of hydrogen with oxygen to form the final product and where the intermediates are recycled.

DETAILED DESCRIPTION OF THE INVENTION

The present invention overcomes the deficiencies of conventional waterborne auto-oxidatively crosslinkable polyurethane dispersions which due to the self-crosslinking chemistry employed are well know to develop significant color over time and cure at a relatively slow rate in comparison to ketone-hydrazide self-crosslinking systems. Moreover, to speed the rate of cure in auto-oxidatively crosslinking polymers, it is common practice, to need to use significant amounts of catalysts or "driers" which can be toxic, are highly colored and relatively expensive. Furthermore, these oxidative driers are often not stable in waterborne systems and can phase separate out, requiring them to be homogenized back into the dispersion prior to application. Auto-oxidative crosslinking does provide the option of using renewable material.

In one embodiment of the invention, the described polyol obtained from the reaction of levulinic acid and epoxidized natural oil is simply co-reacted with a dispersing diol (typically dimethylolpropionic acid) and/or a dispersing polyol and a diisocyanate with an optional and suitable diluent to control viscosity to form a prepolymer. Ionization of the dispersing diol or polyol of the prepolymer with an appropriate dispersing agent will allow the prepolymer to be dispersed in water and chain extended. Addition of a suitable amount of a di- or polyhydrazide to the dispersion, typically at a pH>7.8, allows for a stable dispersion which can rapidly self-crosslink by reaction with ketone groups after the film dries and the pH drops.

A second major embodiment of the invention allow for the addition of a polyketone oligomer, prepared by reacting levulinic acid with an epoxidized natural oil, to the prepolymer described above after it is funned but just prior to dispersing into water. After neutralization of the prepolymer, the prepolymer can be dispersed in a conventional manner where it helps carry and stabilize the poly-ketone oligomer in the water phase (as we have taught in patents U.S. 2006/0264568). This allows for a further increase in the renewable resource content of the coating as well as the potential for improved performance by increasing the crosslink density of the resulting matrix. Moreover, the presence of the poly-ketone oligomer can improve film formation and reduce the application VOC level by acting as a film forming aid prior to eventually reacting into the film/coating matrix.

A third major embodiment of the invention allows for the preparation of waterborne urethane-acrylic dispersions based on either the poly-ketone functional natural oil based polyurethane dispersion or the poly-ketone functional natural oil based polyurethane dispersion also containing the poly-ketone functional oligomer. This can be done by the addition of acrylic or styrene based monomers at anytime during the process and subsequent polymerization when the polyurethane is in the water phase. This includes the use of acrylic or styrene based monomers in the prepolymer phase as a diluent to eliminate the need for volatile organic solvent based diluents including N-methylpyrrolidone, a common diluent for the production of waterborne polyurethane for which there are concerns of toxicity.

Both two component and self-crosslinking polyurethane compositions are known today but either are based solely on petroleum based feed stocks, have performance deficiencies or both. Self-crosslinking waterborne oil modified polyurethane (OMU) dispersions via auto-oxidation are used commercially and contain a portion of the raw material derived from natural sources. However, OMU's have two well known deficiencies; the cure time is relatively long before optimal properties are reached and the coatings have poor color stability which can cause variations of color on a substrate such as a wood floor. Moreover, though waterborne OMU's are based in part on a renewable resource, mainly the unsaturated fatty acid residue; the content of renewable material in a typical polyurethane dispersion composition is relatively low due to the content of other petroleum derived components needed to prepare the unsaturated fatty acid functional diol as well as the final polyurethane. Thus, typically even in aqueous polyurethane dispersions that have a relatively high content of fatty acid, the renewable content is still not significant enough for the final polymer to be considered a renewable or "green" product based on current standards. The present invention corrects the above deficiencies.

Aqueous dispersions of prepolymers from ketone functional molecules derived from natural sources along with hydrazine functional moiety (e.g., hydrazide, hydrazone, ketoxime) are described. The polyurethane can be made by any conventional formation process that can also include the addition of the ketone functional moiety from a renewable source. The ketone molecule from natural sources helps enhance liquid properties prior to film formation and/or help final film properties after final film formation. A preferred ketone molecule is the reaction product of levulinic acid with epoxides of linseed or soybean oil. A residual secondary OH group (reactive hydrogen group) from the reaction of the epoxy group with a ketone containing acid is available from the reaction product for coupling to an isocyanate group. Thus, the ketone functional vegetable oil becomes a ketone containing active hydrogen containing compound (polyol) that can be incorporated into the backbone of a urethane prepolymer.

The reaction of levulinic acid or other ketone or aldehyde containing carboxylic acid with epoxidized natural oils is carried out at relatively moderate temperatures and reaction times when using appropriate catalysts. The resulting polyol is obtained in essentially 100% yield as there are no byproducts as one typically has in conventional esterification reactions. Moreover, the polyol has a higher renewable content as there is no need for petroleum based trimethylol propane or pentaerythritol to be trans-esterified into the natural oil as is conventionally done to prepare oil modified polyols for OMU synthesis. Residual hydroxyl groups are left on the reaction product that can react with polyisocyanates and form urethane prepolymers.

Isocyanates are reacted with active hydrogen containing compounds such as polyols to form urethane prepolymers. The prepolymers are further reacted to eventually form polyurethane (urethane polymers). This prepolymer is in one embodiment neutralized by reaction with at least one neutralizing agent, dispersed in aqueous medium, and optionally chain extended by reaction with at least one of water inorganic or organic polyamine having an average of about 2 or more primary and/or secondary amine groups, or combinations thereof.

In accordance with the invention, the polyurethane or its prepolymer containing the ketone functional vegetable oil is dispersed in an aqueous medium to form a dispersion of composite particles composed of the polyurethane or its prepolymer.

Definitions

In this document, "polyurethane" is a generic term used to describe polymers including oligomers (e.g., prepolymers) which contain multiple urethane groups, i.e., —O—C(=O)—NH—, regardless of how they are made. As well known, polyurethanes can contain additional groups such as urea, allophanate, biuret, carbodiimide, oxazolidinyl, isocynaurate, uretdione, ether, ester, carbonate, etc., in addition to urethane groups. Typically, the prepolymers will be above 1,000 or 2,000 Daltons in number average molecular weight and if chain extended during the processing can reach number average molecular weights in the millions of Daltons.

"Wt, %" means the number of parts by weight of monomer per 100 parts by weight of polymer, or in the case of a polymer and additives blend the number of parts by weight of ingredient per 100 parts by weight of composition or material of which the ingredient forms a part.

"Aqueous medium" means a composition containing a substantial amount of water. It may contain other ingredients as well.

The "final polyurethane product" refers to the polyurethane in the aqueous dispersion product of this invention. When the polyurethane prepolymer is chain extended, the final polyurethane product is this chain extended polymer. When the polyurethane prepolymer is not chain extended, the final polyurethane product is the prepolymer itself.

"Substantial absence of surfactant" as well as "substantially free of residual surfactant" in reference to a dispersion means that the dispersion is made without intentionally including a surfactant (a possibility in some embodiments but not required in all embodiments) for suspending or dispersing the dispersed phase of the dispersion. Surfactant in this context refers to molecules whose primary function is to stabilize particles or go to interfaces between phases and modify the interfacial tension at those interfaces. The term surfactant does not include water dispensability enhancing compounds that, are chemically reacted into, a polyurethane or urethane prepolymer.

The ketone functional group of the ketone functional vegetable oil and hydrazine functional moiety can promote inter particle penetration and coalescence during particle coagulation of the polyurethane dispersion during film formation. If a film or polymer layer is desired in the final application, good coalescence promotes optimal physical properties of strength, film integrity, etc. Desirably, the reaction between the ketone functional molecule and hydrazine functional moiety is delayed until after particle coagulation and coalescence, but the technology is not limited thereby. Desirably, the ketone functional molecule and the hydrazine functional moiety react to form azomethine linkages as taught in U.S. Pat. Nos. 4,210,565 and 4,983,662. Desirably, this reaction between the ketone groups of the ketone functional molecule and the hydrazide groups of the functional moiety proceeds at a reasonable rate at 20-25° C. such that lower molecular weight species associated with these moieties are converted at 20-25° C. (ambient drying temperature) to higher molecular weight and/or crosslinked species that aid rather than detract from polymer hardness, strength, solvent resistance, and related properties of wear resistance.

Ketone Functional Vegetable Oils from Epoxidized or Epoxy Functional Vegetable Oils.

In one embodiment, the ketone functional molecule is made from a reaction of a $C_3$-$C_{20}$ ketone or aldehyde containing carboxylic acid with a polyepoxy compound such as epoxidized triglyceride oil (for example, epoxidized soybean oil or linseed oil), other epoxidized polyesters, or an epoxidized polyol.

The reaction between the $C_{3-20}$ ketone or aldehyde containing carboxylic acid (e.g. an organic acid) and the polyepoxy compound is desirably catalyzed to reduce the reaction time and reaction temperature. Catalysts include trialkyl amines, phosphines such as triphenylphosphine, chromium3+ catalysts, imidiazoles, such as N-methylimidazole, etc. In one embodiment, the $C_3$-$C_{20}$ (i.e., having 3 to 20 carbon atoms) ketone or aldehyde containing carboxylic acid is a $C_3$ to $C_{10}$ species. In another embodiment, it is a $C_3$ to $C_6$ species. In one embodiment, it comprises a ketone containing species. A preferred $C_3$-$C_{20}$ ketone or aldehyde carboxylic acid is levulinic acid (γ-ketovaleric acid; acetylpropionic acid, 4-oxopentanoic acid) or pyruvic acid (α-ketopropionic acid; acetylformic acid).

The triglyceride oils are unsaturated vegetable oils, animal fats, and synthetic triglycerides, which are generally considered to be derived from condensation reactions of various fatty acids and glycerol. While the triglycerides are often described as oils, they may be solids at room temperature. The higher the amount of unsaturation present, the higher the degree of epoxidation possible under similar reaction conditions. Reactions of these oils with unsaturation with strong oxidizers can convert the carbon to carbon double bond in the fatty acids to epoxides peracetic acid being a common strong oxidizer for this purpose. The peracetic acid can be obtained from the reaction of acetic acid with hydrogen peroxide. Epoxidized vegetable oils are commercially available from companies such as Dow and Chemtura. The oxirane oxygen content is generally characterized from about 7-10 or 12% by weight. The oxirane oxygen value is determined by a non-aqueous potentiometric titrimetry using perchloric acid in the presence of tetraethylammonium bromide. Epoxidized soybean and linseed oils are both used as plasticizers and sometimes as acid scavengers.

Hydrogen peroxide is manufactured today almost exclusively by the auto-oxidation of 2-ethyl-9,10-dihydroxyanthracene ($C_{16}H_{14}O_2$) to 2-ethylanthraquinone ($C_{16}H_{12}O_2$) and hydrogen peroxide using oxygen from the air. In this reaction, the hydroxy groups on the middle ring of anthracene deprotonated and are turned into ketones, while two double bonds are lost from the middle ring and are replaced as C=O double bonds in the ketone groups. The anthraquinone derivative is then extracted out and reduced back to the dihydroxy compound using hydrogen gas in the presence of a metal catalyst. The overall equation for the process is deceptively simple:

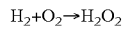

For the purpose of this application, polyepoxides are molecules with two or more epoxy groups per molecule. In one embodiment, the number of epoxide groups is between 2 and 15 per vegetable oils molecule, in another embodiment between 4 and 12 and in another between 4.5 and 8.

Low molecular weight ketone containing species and low molecular weight hydrazine moiety containing species can also improve coalescence so that films with better cohesion or requiring less coalescing aid are possible. Coalescing aids are often volatile organic compounds that may be subject to legislative reduction or elimination. While the ketone and/or hydrazine functional moieties do not need to be attached to polymer chains, the inclusion of polymer attached reactive moieties (either ketone and/or hydrazine) in combination with lower molecular weight functional moiety containing species is anticipated by this disclosure.

A preferred ketone functional molecule in one embodiment derived from triglycerides or polyesters refers to medium to high molecular weight mono of poly ketone or mono or poly aldehyde (excluding formaldehyde) reactant generally from about 500 to 50,000, in one embodiment from 700 to 20,000, and in still another embodiment from about 1,000 to about 5,000 or 10,000 Dalton number average molecular weight. These can be formed by any reaction mechanism as discussed later but ester linkages between the ketone containing acid and epoxidized unit are preferred and more preferred is with the epoxidized triglyceride.

The ketone or aldehyde functional groups are generally not blocked (e.g., temporarily reacted with a removable chemical moiety to avoid premature reaction), although in some embodiments it might be desirable to block some ketone or aldehyde functional groups for specific requirements.

Where the compositions of the invention incorporate non-polyurethanic non-vinylic polycarbonyl compound(s) and/or oligomeric urethane polycarbonyl compounds, the level of such polycarbonyl compound(s) is desirably that to provide a range of 0.05 to 20 moles carbonyl groups per mole of hydrazine (or hydrazone) groups present.

The proportion of carbonyl functional groups in the free radically polymerized polymer (if such is present) is preferably 3 to 200 milliequivalents per 100 g polymer (more preferably 6 to 100 milliequivalents per 100 g polymer). We recognize the possibility to use ketone functional diols or polyols from synthetic sources in combination with those obtained from mainly renewable raw materials.

Hydrazine Functional Molecules/Oligomers (Moieties)

The preferred hydrazine functional moiety refers to a low molecular weight molecule or oligomers having one or more hydrazine or hydrazone groups. By a hydrazine functional group is meant the functional group of formula —$NHNH_2$. A hydrazone functional group is a group derived from such a hydrazine group by reaction with a monoketone or monoaldehyde containing at least 2 carbon atoms. Hydrazine functional moieties can also be dihydrazides and other polyhydrazides as expressed below in that these molecules have the specified —$NHNH_2$ group.

While hydrazine itself ($H_2N$—$NH_2$) at elevated concentrations raises concerns about worker exposure, hydrazide (—$NHNH_2$) containing molecules are less of an exposure issue and offer the opportunity to build molecular weight and/or crosslink molecules/oligomers/polymers after polyurethane dispersion coagulation/film formation at or around room temperature. Volatile amines can play a significant role in the reactions using hydrazine functional moieties as the amines are/can be used in polyurethane dispersions to adjust the pH to the basic side before coalescence and allow the pH to shift to the acid side as the water and volatile amines evaporate. This pH shift and water evaporation promotes the reaction of hydrazine groups with available ketone or aldehyde groups (providing molecular weight buildup and or crosslinking).

The hydrazine functional moieties can be prepared from lower molecular weight hydrazine/hydrazide containing moieties or they can be prepared by reacting hydrazine ($H_2N$—$NH_2$) with mono or poly a) carboxylic acids, b) ketones, or c) aldehydes. Such a reaction would be the reaction of two moles of hydrazine with adipic acid to form the dihydrazide of adipic acid. U.S. Pat. No. 4,983,662 sets forth in column 17, line 44, through column 18, line 42, other hydrazine functional moieties and their source or preparation technique. Examples of preparations and use of hydrazine functional moiety(ies) is set forth in Examples 3, 4, and 5 of the same patent.

Alternatively, the hydrazine functional moieties can be prepared from polymerizing vinyl containing monomers to form oligomers or polymers and then functionalizing said oligomers or polymers by reacting acid, ketone, or aldehyde groups with hydrazine. This is more fully set forth in U.S. Pat. No. 4,983,662 in column 15, line 11, and column 16, line 49. Therein, it uses the term-pendant hydrazinolysable groups to describe groups that can via a pre or post polymerization reaction be converted to hydrazine or hydrazone groups by reacting with hydrazine yielding agent. In this application, the hydrazine functional moiety preferable includes at least one non-polymeric (i.e., less than 2000 Dalton, more preferably less than 1000 Dalton number average molecular weight) hydrazine functional moiety.

Polymeric hydrazine and/or ketone functional polymers may be present and may co-react with the non-polymeric reactants but the polymeric versions of the ketone and hydrazine functional moieties are not required.

Suitable groups for hydrazinolysis (hydrazine yielding agents) are e.g., acid, acid halide and (especially) ester groups. The polymer VII may be a homopolymer but is more usually a copolymer of at least two monomers. Examples of monomers providing chain-pendant hydrazinolysable groups include crotonic acid, alpha-chloroacrylic acid and especially acrylic acid, and acid chlorides or esters thereof, and also methacrylic acid and acid chlorides or esters thereof. There are advantageously used acrylic acid esters of alcohols of low molecular weight, such as methyl, ethyl, propyl, isopropyl, n-butyl or secondary butyl esters. As further co-monomers (not providing hydrazinolysable groups) which can be used to form hydrazine functional moieties there may be used, for example, vinyl halides such as vinyl chloride, vinyl fluoride or vinylidene chloride; vinyl-aryl-compounds such as styrene or substituted styrenes. There may also be used polymerizable olefins, such as isobutylene, butadiene or 2-chlorobutadiene, or heterocyclic compounds containing at least one vinyl group such as the various vinyl pyridines.

When a hydrazone-containing vinyl polymer or oligomer is required, the hydrazine groups may be converted to hydrazone groups by reacting the hydrazine functional moiety with a saturated monoketone or monaldehyde containing at least two carbon atoms and preferably of boiling point 30 to 200° C. Examples of such compounds include, for example, aliphatic ketones or aldehydes, such as acetone, ethyl methyl ketone, diisopropyl ketone, etc.

A preferred hydrazine functional moiety in one embodiment refers to a low molecular weight molecule or oligomers having one or more hydrazine, hydrazide, or hydrazone groups. By a hydrazine functional group is meant the functional group of formula —NHNH$_2$. A hydrazone functional group is a group derived from such a hydrazine group by reaction with a monoketone or monaldehyde containing at least 2 carbon atoms. A typical hydrazide group might be formed by reacting a mono or polycarboxylic acid with hydrazine, or by reaction between an —NCO and hydrazine. Synthesis of hydrazine functional moiety(ies) will be discussed later.

Polyurethane Prepolymer Ingredients

The polyurethane prepolymers of this invention are formed from at least one polyisocyanate, at least one active hydrogen-containing compound and optionally, at least one water-dispersability enhancing compound.

(i) Polyisocyanate

Suitable polyisocyanates have an average of about two or more isocyanate groups, preferably an average of about two to about four isocyanate groups per molecule and comprising about 5 to 20 carbon atoms (in addition to nitrogen, oxygen, and hydrogen) and include aliphatic, cycloaliphatic, arylaliphatic, and aromatic polyisocyanates, as well as products of their oligomerization, used alone or in mixtures of two or more. Diisocyanates are more preferred. Aliphatic isocyanates are preferred where UV exposure is anticipated.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl)cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate and its isomers (e.g., 2,4'; 2,2'; and 4,4°), toluene diisocyanate and its isomers, naphthalene diisocyanate, their oligomeric forms and the like. Preferred aromatic polyisocyanates are diphenylmethylene diisocyanate and toluene diisocyanate.

(ii) Active Hydrogen-containing Compounds

Any compound that provides a source of active hydrogen for reacting with isocyanate groups via the following reaction: —NCO+H—X→—NH—C(=O)—X, can be used as the active hydrogen-containing compound in this invention. Examples include but are not limited to polyols, polythiols and polyamines.

in this disclosure, desirably at least 10, 20, 30, 40, 50, 60, 70, 80, 90, or 96 weight percent of the total polyols or compounds with active hydrogen for reacting with isocyanate groups are derived from the reaction of ketone containing carboxylic acids with epoxidized vegetable oils. In one embodiment, the epoxidized vegetable oils are present in the polyurethane such that the residue of the epoxidized vegetable oil, i.e., the vegetable oil and the atoms associated with the epoxy group thereon, are at least 10 wt. % of the polyurethane component, in another embodiment at least 20 wt. %, in another embodiment at least 30 wt. %, and in yet another embodiment at least 40 or 50 wt. %. This adds the renewable components to the polyurethane dispersions along with the levulinic acid (if the levulinic acid is obtained via fermentation of biomass as opposed to synthetically sourced). Other sources of active hydrogen for reacting with the isocyanate groups can be utilized to impart particular properties to the composition.

"Polyol" in this context means any product having an average of about two or more hydroxyl groups per molecule. Examples include low molecular weight products called "extenders" with number average molecular weight less than about 500 Dalton such as aliphatic, cycloaliphatic and aromatic polyols, especially diols, having 2-20 carbon atoms, more typically 2-10 carbon atoms, as well as "macroglycols," polymeric polyols having molecular weights of at least 500 Daltons, more typically about 1,000-6,000 Daltons, or even 1,000-10,000 Daltons. Examples of such macroglycols include polyester polyols including alkyds, polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, halogenated polyesters and polyethers, and the like, and mixtures thereof. The polyester polyols, polyether polyols, polycarbonate polyols, polysiloxane polyols, and ethoxylated polysiloxane polyols are preferred.

The polyester polyols typically are esterification products prepared by the reaction of organic polycarboxylic acids or their anhydrides with a stoichiometric excess of a diol or diols. Examples of suitable polyols for use in the reaction include poly(glycol adipate)s, poly(ethylene terephthalate) polyols, polycaprolactone polyols, alkyd polyols, orthophthalic polyols, sulfonated and phosphonated polyols, and the like, and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycahexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic and/or aromatic dibasic acids.

Particularly interesting polyols are the polyester diols, i.e., any compound containing the —C(=)—O— group. Examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, e.g., Piothane 67-3000 HAI, Piothane 67-500 HAI, Piothane 67-3000 HNA (Panolam Industries) and Piothane 67-1000 HNA; as well as propylene glycol maleic anhydride adipic acid polyester diols, e.g., Piothane 50-1000 PMA; and hexane diol neopentyl glycol fumaric acid polyester diols, e.g., Piothane 67-500 HNF. Other preferred polyester diols include Rucoflex™ S1015-35, S1040-35, and S-1040-110 (Bayer Corporation).

The polyether polyols that can be used as the active hydrogen-containing compound in accordance with the present invention contain the —C—O—C— group. They can be obtained in a known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, styrene oxide, tetrahydrofuran, epichlorohydrin, and the like, and mixtures thereof. Preferred polyethers include poly(propylene glycol), polytetrahydrofuran, and copolymers of polyethylene glycol) and poly(propylene glycol).

Polycarbonate polyols include those containing the —O—C(=O)—O— group. They can be obtained, for example, from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene. Aliphatic and cycloaliphatic polycarbonate polyols can also be used.

Useful polyhydroxy polyacetals include the compounds that can be prepared from the reaction of (A) aldehydes, such as formaldehyde and the like, and (B) glycols such as diethylene glycol, triethylene ethoxylated 4,4'-dihydroxy-diphenyldimethylmethane, 1,6-hexanediol, and the like. Polyacetals can, also be prepared by the polymerization of cyclic acetals.

Instead of or in addition to a polyol, other compounds may also be used to prepare the prepolymer. Examples include polyamines, polyester amides and polyamides, such as the predominantly linear condensates obtained from reaction of (A) polybasic saturated and unsaturated carboxylic acids or their anhydrides, and (B) polyvalent saturated or unsaturated aminoalcohols, diamines, polyamines, and the like, and mixtures thereof.

Diamines and polyamines are among the preferred compounds useful, in preparing the aforesaid polyester amides and polyamides. Suitable diamines and polyamines include 1,2-diaminoethane, 1,6-diaminohexane, pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethyl-cyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazin-e, N,N,N'-tris-(2-aminoethyl)ethylene diamine, N-[N-(2-aminoethyl)-2-amino-ethyl]-N'-(2-aminoethyl)-piperazine, N-(2-aminoethyl)-N'-(2-piperazinoethyl-1)-ethylene diamine, N,N-bis-(2-aminoethyl)-N-(2-piperazinoethyl) amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-tri-methyl-cyclohexane (isophorone diamine or IPDA), bis-(4-aminocyclohexyl)-m-ethane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine™. D-2000 and D-4000, which are amine-terminated polypropylene glycols, differing only by molecular weight, and which are available from Huntsman Chemical Company.

Low molecular weight alkylene polyols (e.g., glycerol, trimethylol propane, etc.) can be used as urethane branching agents. Branching can provide beneficial properties to a urethane polymer and can provide additional functional (reactive) end groups (generally above 2 as one goes from linear oligomers to branched oligomers or polymer) for each urethane prepolymer or polymer.

(iii) Water-Dispersibility Enhancing Compounds

Polyurethanes are generally hydrophobic and not water-dispersible. In accordance with one embodiment of the invention, therefore, at least one water-dispersibility enhancing compound (i.e., monomer), which has at least one, hydrophilic (e.g., poly(ethylene oxide), ionic or potentially ionic group is optionally included in the polyurethane prepolymer to assist dispersion of the polyurethane prepolymer as well as the chain-extended polyurethane made therefrom in water, and also enhancing the stability of the dispersions so made. Typically, this is done by incorporating a compound bearing at least one hydrophilic group or a group that can be made hydrophilic (e.g. by chemical modifications such as neutralization) into the polymer chain. These compounds may be of a nonionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number from about 1 to about 60, typically 1 to about 40, or even 10 to 35 or 12 to 30 or 14 to 25. Other water-dispersibility enhancing compounds can also be reacted into the prepolymer backbone through urethane linkages or urea linkages, including lateral or terminal hydrophilic ethylene oxide or ureido units.

Water dispersibility enhancing compounds of particular interest are those which can incorporate carboxyl groups into the prepolymer. Normally, they are derived from hydroxy-carboxylic acids having the general formula $(HO)_x Q(COOH)_y$, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof. Dihydroxy-carboxylic acids such as DMPA and DMBA are more preferred.

Water dispersibility enhancing compounds may include reactive polymeric polyol components that contain pendant anionic groups which can be polymerized into the prepolymer backbone to impart water dispersible characteristics to the polyurethane subsequent to chain extension. The term anionic functional polymeric polyol includes anionic polyester polyols, anionic polyether polyols, and anionic polycarbonate polyols. These polyols include moieties that contain active hydrogen atoms. Such polyols containing anionic groups are described in U.S. Pat. No. 5,334,690.

Another group of water-dispersibility enhancing compounds of particular interest are side chain hydrophilic monomers. Some examples include alkylene oxide polymers and copolymers in which the alkylene oxide groups have from 2-10 carbon atoms as shown, for example, in U.S. Published Patent Application No. 20030195293, the disclosure of which is incorporated herein by reference.

Other suitable water-dispersibility enhancing compounds include thioglycolic acid, 2,6-dihydroxybenzoic acid, sulfoisophthalic acid (this component would preferably be incorporated as part of a polyester), polyethylene glycol, and the like, and mixtures thereof.

(iv) Compounds Having at Least One Crosslinkable Functional Group

Compounds having at least one crosslinkable functional group can also be incorporated into the polyurethane prepolymers of the present invention, if desired. Examples of such compounds include those having carboxylic, carbonyl, amine, hydroxyl, epoxy, acetoacetoxy, urea-formaldehyde, auto-oxidative groups that crosslink via oxidization, ethylenically unsaturated groups optionally with U.V. activation, olefinic and hydrazide groups, blocked isocyanates, and the like, and mixtures of such groups and the same groups in protected forms (so crosslinking can be delayed until the composition is in its application (e.g., applied to a substrate) and coalescence of the particles has occurred) which can be reversed back into original groups from which they were derived (for crosslinking at the desired time).

Other suitable compounds providing crosslinkability include thioglycolic acid, 2,6-dihydroxybenzoic acid, and the like, and, mixtures thereof.

(v) Catalysts

The prepolymer may be formed without the use of a catalyst if desired but using a catalyst may be preferred in some instances. Examples of suitable catalysts include stannous octoate, dibutyl tin dilaurate, and tertiary amine compounds such as triethylamine and bis-(dimethylaminoethyl)ether, morpholine compounds such as beta,beta-dintorpholinodiethyl ether, bismuth carboxylates, zinc bismuth carboxylates, iron chloride, potassium octoate, potassium acetate, and DABCO® (diazabicyclo[2.2.2]octane) from Air Products.

Preferred catalysts are a mixture of 2-ethylhexanoic acid and stannous octoate, e.g., FASCAT® 2003 from Elf Atochem North America, and DABCO®.

(vi) Ingredient Proportions

Normally, the prepolymer produced in the present invention will be isocyanate-terminated. For this purpose, the ratio of isocyanate to active hydrogen in the prepolymer typically ranges from about 1.3/1 to about 2.5/1, in one embodiment from about 1.5/1 to about 2.1/1, and in another embodiment from about 1.7/1 to about 2/1.

The typical amount of water-dispersibility enhancing compound in the prepolymer will be up to about 50 wt. %, more typically from about 2 wt. % to about 30 wt. %, and more especially from about 2 wt. % to about 10 wt. % based on the total weight of the prepolymer.

The amount of catalyst used, if used, to form the prepolymer will typically be from about 5 to about 200 parts per million of the total weight of prepolymer reactants.

The polyurethane polymer(s) and the ketone functional molecule and hydrazine functional moiety of the composition of the invention may be brought together by any suitable technique.

Where the compositions of the invention incorporates non-polyurethanic non-vinylic (or polyhydrazone) compound(s) and/or oligomeric urethane polyhydrazine (or polyhydrazone) compound(s), the level of such polyhydrazine (or polyhydrazone) compounds(s) in one embodiment is that to provide a range of 0.05 to 20 moles hydrazine (or hydrazone) groups present per mole of carbonyl groups present, in another embodiment 0.1 to 10 moles per mole, and in another embodiment 0.67 to 1.11 moles per mole. Examples of such suitable polyhydrazine (or polyhydrazone) compounds include dicarboxylic acid bishydrazides of formula

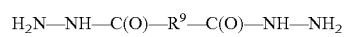

and dicarboxylic acid bis-hydrazones of formula.

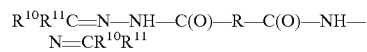

wherein $R^9$ is a covalent bond or a polyalkylene (preferably polymethylene) or alicyclic group having from 1 to 34 carbon atoms or a divalent aromatic ring, and $R^{10}$ and $R^{11}$ are selected from the group consisting of H and ($C_1$ to $C_6$) alkyl and alicyclic groups. Examples of suitable dihydrazides include oxalic acid dihydrazide, malonic acid dihydrazide, succinic acid dihydrazide, glutaric acid dihydrazide, adipic acid dihydrazide, cyclohexane dicarboxylic acid bis-hydrazide, azelaic acid bis-hydrazide, and sebacic acid dihydrazide. Other suitable compounds are set forth in U.S. Pat. No. 4,983,662 at column 18, line 3 through column 18, line 42.

The compositions of the invention may optionally contain 0.0002 to 0.02 mole per mole of hydrazine group(s) of a heavy metal ion. This may be added in the form of suitable water-soluble metal salts, particularly chlorides, sulphates, metal hydrazide complexes, and acetates. Suitable heavy metal water-soluble salts are, in particular, those of Cu, Zn, Fe, Cr, Mn, Pb, V, Co and Ni.

Prepolymer Manufacture

Typically, prepolymer formation will be done by bulk or solution polymerizing the ingredients of the prepolymer. Thus, the ingredients forming the prepolymer, e.g., the polyisocyanate(s), the active hydrogen-containing compound(s) (preferably with a large proportion of ketone containing species derived from reactions of ketone containing carboxylic acids with epoxidized vegetable oils) and/or the water-dispersibility enhancing compound(s), are combined to form the prepolymer. Additional ketone functional molecule(s)/oligomer(s) nanoparticles can also be combined with the prepolymer after polymerization is substantially or even totally completed, if desired for another purpose, e.g., to have more plasticization with reactive plasticizers.

Bulk and solution polymerization are well known techniques and described, for example, in "Bulk Polymerization," Vol. 2, pp. 500-514, and "Solution Polymerization," Vol. 15, pp. 402-418, *Encyclopedia of Polymer Science and Engineering,* © 1989, John Wiley & Sons, New York. See, also, "Initiators," Vol. 13, pp. 355-373, Kirk-Othmer, *Encyclopedia of Chemical Technology,* © 1981, John Wiley & Sons, New York. The disclosures of these documents are also incorporated herein by reference.

Dispersion in an Aqueous Medium

Once the polyurethane prepolymer is formed, it is dispersed in an aqueous medium to form a dispersion. Dispersing the prepolymer in aqueous medium can be done by any conventional technique, in the same way that other polyurethane prepolymers made by bulk or solution polymerization are dispersed in water. Normally, this will be done by combining the prepolymer blend, with water with mixing. Where solvent polymerization is employed, the solvent and other volatile components can optionally be distilled off from the final dispersion, if desired. Chain extender and/or the hydrazine functional moiety for reacting with the ketone group can be added at this stage or later.

In one embodiment of the invention, where the prepolymer includes enough water-dispersibility enhancing compound to form a stable dispersion without added emulsifiers (surfactants), the dispersion can be made without such compounds, i.e., substantially free of surfactants, if desired. The advantage of this approach is that the coatings or other products made from the polyurethane exhibit less water sensitivity, better film formation, less foaming and reduced growth of mold, bacteria and so forth.

Prepolymer Neutralization

In those instances in which the prepolymer includes water-dispersibility enhancing compounds which produce pendant carboxyl groups, these carboxyl groups can be converted to carboxylate anions for enhancing the water-dispersibility of the prepolymer.

Suitable neutralizing agents for this purpose include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

Chain Extension

The polyurethane composition dispersions in water produced as described above can be used as is, if desired. Alternatively, they can be chain extended to convert the prepolymers in the composite particles to more complex polyurethanes.

As a chain extender, at least one of water, inorganic or organic polyamine having an average of about 2 or more primary and/or secondary amine groups, amine functional polyols, ureas, or combinations thereof is suitable for use in this invention. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable ureas include urea and it derivatives, and the like, and mixtures thereof. Hydrazine is most preferred or hydrazine combined with other extenders, preferably water soluble ones such as ethylene diamine and is most preferably used as a solution in water. The amount of chain extender, which can be added before or after dispersion, typically ranges from about 0.5 to about 1.1 equivalents based on available equivalents of isocyanate.

Additional Ingredients and Features

The polyurethane prepolymers, the product polyurethanes produced therefrom, and the aqueous prepolymer composition aqueous dispersions of the present invention as described above can be made with various additional ingredients and features in accordance with known polyurethane technology. Examples include:

(i) Polymer Branching

Branching of the ultimate polymer product, as well as the prepolymer, can be accomplished for aiding tensile strength and improving resistance to creep—that is, recovery to that of or near its original length after stretching. In this regard, see U.S. Published Patent Application No. 20030195293, the disclosure of which has been incorporated herein by reference above.

(ii) Monofunctional Active Hydrogen-Containing Compounds

The prepolymers of this invention can also be made with monofunctional active hydrogen-containing compounds to enhance dispersibility of the prepolymer in aqueous medium and impart other useful properties, for example, cross-linkability, as well as to adjust the morphology and rheology of the polymer when coated onto a substrate, as also described in the above-noted U.S. Published Patent Application No. 20030195293.

(iii) Plasticizers

The polyurethane prepolymers and ultimate polyurethane products of this invention can be prepared in the presence of a plasticizer. The plasticizer can be added at any time during prepolymer preparation or dispersion or to the polyurethane during or after its manufacture. Plasticizers well known to the art can be selected for use in this invention according to parameters such as compatibility with the particular polyurethane and desired properties of the final composition. See, for example, WO 02/08327 A1, as well as the above-noted U.S. Published Patent Application No. 20030195293.

(iv) Other Additives for Preparation of Dispersions

Other additives well known to those skilled in the art can be used to aid in preparation of the dispersions of this invention. Such additives include stabilizers, defoamers, antioxidants (e.g., Irganox 1010), UV absorbers, carbodiimides, activators, curing agents, stabilizers such as carbodiimide, colorants, pigments, neutralizing agents, thickeners, non-reactive and reactive plasticizers, coalescing agents such as di(propylene glycol) methyl ether (DPM), waxes, slip and release agents, antimicrobial agents, surfactants such as Pluronic™ F68-LF and IGEPAL™ CO630 and silicone surfactants, metals, coalescents, salts, flame retardant additives (e.g., antimony oxide), antiozonants, and the like. They can optionally be added as appropriate before and/or during the processing of the dispersions of this invention into finished products as is well known to those skilled in the art. Additives may also be used as appropriate in order to make articles or to treat other products (such as by impregnation, saturation, spraying, coating, or the like). The dispersions of this invention typically have total solids of at least about 20 wt. %, preferably at least about 25 wt. % and more preferably at least about 30 wt. %.

(v) Blends with Other Polymers and Polymer Dispersions

The dispersions of this invention can be combined with commercial polymers and polymer dispersions by methods well known to those skilled in the art. Such polymers and dispersions include those described in WIPO Publication WO 02/02657 A2, U.S. Pat. Nos. 4,920,176, 4,292,420, 6,020,438, 6,017,997 and a review article by D. P. Tate and T. W. Bethea, *Encyclopedia of Polymer Science and Engineering*, Vol. 2, p. 537, the disclosures of which are incorporated herein by reference.

Similarly, the dispersions of this invention can be formed by dispersing the prepolymer mixture in a previously formed aqueous dispersion of another polymer or polymers and/or nanoparticles. In other words, the aqueous medium into which the prepolymer mixture is dispersed in accordance with the present invention can be a previously formed aqueous dispersion of another polymer or polymers including those made by emulsion and suspension polymerization techniques and/or nanoparticles (or vice versa where one would disperse another urethane into the inventive urethane dispersion).

(vi) Hybrids with Other Polymers

The aqueous dispersions of this invention can also be used as seed polymers for forming hybrids of polyurethanes with other polymers. This can be done by forming the aqueous dispersions of polyurethane composite in the manner described, above and then polymerizing additional monomers by emulsion or suspension polymerization in the presence of these dispersions, i.e., with the inventive dispersions being mixed with the additional monomers before polymerization is completed. Hybrids of polyurethanes and acrylics can be made to advantage by this approach.

Still another way of making hybrid polymers in accordance with the present invention is to include ethylenically unsaturated monomers in the polyurethane prepolymer reaction system and to cause these monomer to polymerize when or after the prepolymer is dispersed in aqueous medium. In this approach, the ethylenically unsaturated monomers act as a diluent during prepolymer formation. In the aqueous medium, these ethylenically unsaturated monomers can be polymerized to completion with or without additional monomers being added. Hybrids of polyurethanes and acrylics can be made to advantage by this approach, as well.

This technology is taught in U.S. Pat. Nos. 4,644,030; 4,730,021; 5,137,961; and 5,371,133. Another urethane-acrylic hybrid is often known as synthetic alloy urethane-acrylic where a urethane polymer is dispersed into a waterborne polymer dispersion or emulsion. This is taught in WO 98/38249 and U.S. Pat. No. 6,022,925.

The acrylic polymer or copolymer can be from a variety of unsaturated monomers such as from acrylate, alkyl (alk)acrylate, vinyl chloride, vinylidene chloride, vinyl acetate, styrene, butadiene, vinyl acetate and unsaturated acid containing monomers.

The various alkyl acrylates (or esters or acrylic acid) have the formula

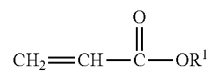

Formula 1 where $R^1$ is an alkyl group containing 1 to about 15 carbon atoms, an alkoxyalkyl group containing a total of 1 to about 10 carbon atoms, a cyanoalkyl group containing 1 to about 10 carbon atoms, or a hydroxy alkyl group containing from 1 to about 18 carbon atoms. The alkyl structure can contain primary, secondary, or tertiary carbon configurations and normally contains 1 to about 10 carbon atoms with 2 to 8 carbon atoms being preferred. Examples of such acrylic esters include methyl acrylate, ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, and the like. Preferred examples include ethylacrylate, butyl acrylate, 2-ethyl hexyl acrylate, and the like.

The various alkyl alkacrylates (or esters of alkacrylic acid) have the formula

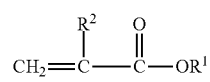

Formula 2 wherein $R^1$ is as set forth above with respect to Formula 1 and $R^2$ is an alkyl having from 1 to about 4 carbon atoms, desirably 1 or 2 carbon atoms with methyl being especially preferred. Examples of various alkyl (alk)acrylates include methyl methacrylate, ethyl methacrylate, methoxymethyl acrylate, methoxyethyl acrylate, ethoxyethyl acrylate, butoxy ethyl acrylate, ethoxypropyl acrylate, and the like. Derivatives include hydroxyethyl acrylate, hydroxypropyl acrylate, hydroxybutyl acrylate, and the like. Mixtures of two or more of the above monomers can also be utilized.

Unsaturated acid containing monomers include acrylic acid, methacrylic acid, itaconic acid, maleic acid, fumaric acid, 2-carboethyl acrylate and the like. Acrylic acid is preferred. Half esters of the above carboxylic acids can also be used as monomers wherein the ester portion is desirably an alkyl having from 1 to about 10 carbon atoms and specific examples include mono methyl maleate, mono methyl fumarate, mono methyl itaconate, and the like.

Other co-polymerizable (ethylenically unsaturated) monomers may be utilized to make copolymers including styrenic monomers (as a co-monomer in the acrylate latex), vinyl chloride type monomers, acrylonitrile type monomers, various vinyl ester monomers, various acrylamides monomers, various alkynol acrylamides and the like. Considering the styrenic monomers (as both a primary monomer in styrene-butadiene polymers or a co-monomer in acrylate polymers), they are often referred to as vinyl substituted aromatic compounds (styrenic monomers) and include styrene, alkyl substituted styrene 1-vinylnaphthalene, 2-vinylnaphthalene, and the alkyl, cycloalkyl, aryl, alkaryl and aralkyl derivatives thereof in which the total number of carbon atoms in the combined substituents is generally from 8 to about 12. Examples of such compounds include 3-methylstyrene vinyltoluene; alpha-methylstyrene; 4-n-propylstyrene, 4-t-butylstyrene, 4-dodecyl-styrene, 4-cyclohexylstyrene; 2-ethyl-4-benzylstyrene; 4-methoxy-styrene; 4-dimethylaminostyrene; 3,5-diphenoxystyrene; 4-p-tolylstyrene; 4-phenylstyrene; 4,5-dimethyl-1-vinylnaphthalene; 3-n-propyl-2-vinyl-naphthalene, and the like. Styrene is preferred.

The vinyl chloride type monomers include vinyl chloride, vinylidene chloride, and the like.

The vinyl esters can generally be represented by the following formula

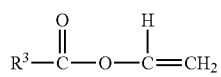

Formula 3 where $R^3$ is an alkyl generally having from 1 to about 10 or 12 carbon atoms with from about 1 to about 6 carbon atoms being preferred. Accordingly, suitable vinyl esters include vinyl formate, vinyl acetate, vinyl propionate, vinyl butyrate, vinyl valerate, and the like. Vinyl esters with larger $R^3$ groups include the vinyl versatate monomers, such as Veo VA-P, Veo Va-10, and Veo Va-11.

The various vinyl ethers can be represented by the formula

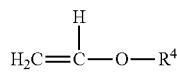

Formula 4 where $R^4$ is desirably an alkyl having from 1 to about 10 carbon atoms. Specific examples include methyl vinyl ether, ethyl vinyl ether, butyl vinyl ether, and the like with methyl vinyl ether being preferred.

The acrylonitrile type monomers include acrylonitrile, or methacrylonitrile, or ethacrylonitrile, and the like can be utilized. Acrylamide monomers which can be polymerized to form a copolymer generally have the following formula

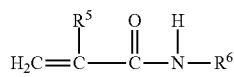

Formula 5 wherein $R^5$ is H or methyl and $R^6$ is generally hydrogen or an alkyl, straight chain or branched, having from 1 to about 18 carbon atoms. Specific examples include acrylamide, ethyl acrylamide, butyl acrylamide, tert-octyl acrylamide, and the like. Unlike the other optional monomers the one or more acrylamides can be utilized in large amounts such as up to about 20 percent by weight of the copolymer and desirably from about 0.5 to about 10 percent by weight.

The alkenol acrylamides can generally, have the formula

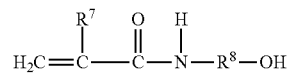

Formula 6 wherein $R^7$ is H or methyl, $R^8$ can be hydrogen and preferably is an alkyl, straight chain or branched, having from 1 to about 18 carbon atoms and desirably from 1 to 10 carbon atoms. Specific examples of alkenol acrylamides include methanol acrylamide, ethanol acrylamide, propanol acrylamide, methylol methacrylamide, and the like.

Functionalized acrylamides can also be utilized. Examples of such acrylamides include AMPS®, i.e., acrylamidomethylpropane sulfonic acid, DMAPMA, i.e., dimethylaminopropyl methacryamide, and the like.

Carbonyl containing unsaturated comonomers may be copolymerized with the above monomers to make acrylic or vinyl polymers. Examples of carbonyl-containing monomers which may be mentioned include acrolein, methacrolein, diacetone-acrylamide, crotonaldehyde, 4-vinylbenzaldehyde, vinyl alkyl ketones of 4 to 7 carbon atoms such as vinyl methyl ketone, and acryloxy- and methacryloxy-alkyl propranols of formula $H_2C=C(R^3)-C(O)-O-C(R^4)H-C(R^5)(R^6)-C(O)H$ where $R^3$ is H or methyl, $R^4$ is H or alkyl of 1 to 3 carbon atoms, $R^5$ is alkyl of 1 to 3 carbon atoms, and $R^6$ is alkyl of 1 to 4 carbon atoms. Further examples include acrylamidopivalaldehyde, methacrylamidopivalaldehyde, 3-acrylamidomethyl-anisaldehyde, diacetone acrylate, acetonyl acrylate, diacetone methacrylate, acetoacetoxyethylmethacrylate, 2-hydroxypropylacrylate acetylacetate, and butanediolacrylate acetylacetate. More details on using these monomers are in U.S. Pat. No. 4,983,662.

The vinyl monomers described above can be intentionally grafted or copolymerized with the urethane/polyurethane polymer component of the invention by using active, hydrogen containing vinyl monomers in the formation of the prepolymer or the vinyl polymers. Examples of such active hydrogen containing vinyl monomers include 2-hydroxyethyl acrylate (2HEA) and 2-hydroxyethyl methacrylate (2HEMA).

The polymers can be polymerized by one or more free radical initiators to form one or more different alkali sensitive copolymers of the present invention. Conventionally free radical initiators known to the art and to the literature can be utilized to initiate polymerization of the various above-noted monomers or co-monomers to form a polymer or copolymer. Such free radical initiators generally include the persulfates, the peroxides, and azo compounds, as well as redox combinations and radiation sources. Examples of preferred persulfate initiators include potassium persulfate, sodium persulfate, or ammonium persulfate, and the like. The free radical polymerization can be an emulsion, bulk, solution, dispersion, etc., polymerization.

Generally, any type of peroxide, azo, redox system, or related initiator system can be utilized. Peroxide systems include dicumyl peroxide, cumene hydroperoxide, t-butyl perbenzoate, bis(t-butylperoxy) diisopropyl benzene, diisopropyl benzene hydroperoxide and n-butyl 4,4-bis(t-butylperoxy) valerate, as well as benzoyl peroxide, and t-butyl hydroperoxide, and the like. Cumene hydroperoxide, t-butyl hydroperoxide and diisopropyl benzene hydroperoxide are preferred. Azo initiators include 2,2'-azobis(isobutyronitrile) (AIBN) and related azo initiators.

Polymers or copolymers, can be made by utilizing chain-transfer agents/polymer physical property modifiers. Conventional chain-transfer agents can be utilized such as various mercaptans, for example, thioethanol mercaptan, hydroxylethyl mercaptan, various reaction products of alkyl esters of mercaptan with acidic acid or with thioglycolic acid, and the like wherein the alkyl group has from about 2 to about 20 carbon atoms. Another suitable chain transfer agent is beta mercapto propanionic acid and its esters such as butyl-3-mercaptoproprinate.

Another technique is to disperse an isocyanate prepolymer into a waterborne polyethylenic polymer dispersion as taught in WO 98/38249. A method variation to make urethane-acrylic copolymers in accordance with the present invention by either including ethylenically unsaturated monomers in the polyurethane prepolymer reaction system and/or to add them to the final polymer dispersion and to cause these monomer to copolymerize with the polyurethane after the prepolymer is dispersed in aqueous medium is described in WO06020281A1, incorporated herein by reference. In this approach, the ethylenically unsaturated monomers are reacted into the polyurethane backbone via a RAFT (reversible addition-fragmentation chain transfer) agent containing hydroxyl functionality that is incorporated into the polyurethane of the invention during prepolymer formation using conventional free radical polymerization methods. This is in contrast to the previous descried "urethane-acrylic hybrid" or composite approach where the acrylic and urethane polymers remain for the most part as individual polymer chains unless grafting points (unsaturated groups, particularly activated unsaturated groups) are incorporated in the polyurethane. The acrylic polymer may potentially become grafted randomly into the polyurethane during free radical polymerization via hydrogen abstraction on the polyurethane backbone.

(vii) Water-Borne Energy Curable Polyurethane Compositions

It is already known that water-borne polyurethane and hybrid compositions that can be cured by application of energy (UV and IR radiation and/or electron beams) can be made by end-capping the polyurethane with (meth)acrylic esters and other ethylenically unsaturated monomers. This technology can be applied to this invention to provide energy-curable water-borne polyurethane coatings.

Alternative Methods of Manufacture

Described above is a typical way the dispersions of the present invention can be made, i.e., by forming a prepolymer blend in the substantial absence of water and then dispersing the blend in an aqueous medium with mixing. Other known ways of making aqueous polyurethane dispersions can also be used to make the dispersions of this invention. Examples are (i) Shear Mixing Dispersing the prepolymer by shear forces with emulsifiers (external emulsifiers, such as surfactants, or internal emulsifiers having nonionic, anionic, cationic and/or zwitterionic groups as part of or pendant to the polyurethane backbone, and/or as end groups on the polyurethane backbone).

(ii) Acetone Process

A prepolymer is formed with or without the presence of acetone, MEK, and/or other polar solvents that are non-reactive and easily distilled. The prepolymer is further diluted in said solvents as necessary, and optionally chain extended with an active hydrogen-containing compound. Water is added to the (optionally chain-extended or during chain extension to control viscosity) polyurethane, and the solvents are distilled off. A variation on this process would be to chain extend the prepolymer after its dispersion into water or into water containing chain extender.

(iii) Melt Dispersion Process

An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

(iv) Ketazine and Ketimine Processes

Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

(v) Continuous Process Polymerization

An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

(vi) Reverse Feed Process

Water and optional neutralizing agent(s) and/or extender amine(s) are charged to the prepolymer under agitation. The prepolymer can be neutralized before water and/or diamine chain extenders are added.

Applications

Ketone functional molecule(s)/oligomer(s) (including ketone functional diols and polyols) can impart several useful properties to polymers including better film formation due to more low molecular weight components enhancing flow; higher crosslink density (improving mar and scratch resistance, barrier properties, chemical and stain resistance, higher tensile strength, UV stability, and so forth.

The aqueous polyurethane composite particle dispersions of the present invention, both in prepolymer and chain extended form, are useful to make coatings, adhesives, and films for porous and non-porous substrates such as papers, non-woven materials, textiles, leather, wood, concrete, masonry, metals with or without primer, plastics (e.g., polypropylene, polyester, polyurethane), house wrap and other building materials, fiberglass, polymeric articles, personal protective equipment (such as hazardous material protective apparel, including face masks, medical drapes and gowns, and firemen's turnout gear), and the like. Applications include papers and non-wovens; fibrous materials; films, sheets, composites, and other articles; inks and printing binders; flock and other adhesives; and personal care products such as skin care, hair care, and nail care products; livestock and seed applications; and the like. A preferred embodiment is use as a mar and scratch resistant interior or exterior coating, such as plastics coatings for vehicles and/or consumer electronics and/or wood floor coatings. As coating compositions, they may be applied by consumers or professionals by any conventional method including brushing, dipping, flow coating, spraying, and the like.

Any fibrous material can be coated, impregnated or otherwise treated with the compositions of this invention by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The compositions of this invention can be used as adhesives or to augment or supplement adhesive types well known to those skilled in the art. For example, particular adhesive properties can be achieved by varying type and amount of isocyanate(s); type, amount, and molecular weight of polyol(s); and amount of poly(alkylene oxide) side chain units.

In addition, the principles of the present invention can be applied to other technologies for manufacturing aqueous polyurethane dispersions. For example, this invention can be applied to the technique for manufacturing plasticized polyurethane dispersions described in U.S. Pat. No. 6,576,702 b' adding plasticizers to the polyurethane prepolymers described in that patent before they are dispersed in aqueous medium. Similarly, this invention can be applied to the technique for manufacturing breathable polyurethane dispersions (i.e., dispersions which form layers of breathable polyurethanes) described in U.S. Published Patent Application No. 20030195293, as well as to the technique for manufacturing core-shell polyurethane dispersions described in U.S. Published Patent Application No. 20050004306. The disclosures of the above patent and published applications are incorporated herein by reference.

EXAMPLES

The following examples are presented to illustrate this invention:

List of Ingredients:
1. Epoxidized Soybean Oil (Plasthall ESO) available from Hallstar in Chicago, Ill.
2. Levulinic acid
3. 1,4-Diazabicyclo[2.2.2]octane, DABCO, available from Air Products, Lehigh Valley, Pa.
4. Di-cyclohexylmethane di-isocyanate
5. Santicizer®2148 an alkyl aryl phosphate ester available from Ferro Corp. in Cleveland, Ohio
6. Proglyde DMM, Dipropylene glycol dimethyl ether
7. Dimethylolproprionic acid
8. Trimethylamine
9. Hycat™ 2000 (activated $Cr^{3+}$ catalyst) available from Dimension Technology Chemical Systems, Inc. in Fair Oaks, Calif.
10. N-methylpyrrolidone
11. BHT, (butylated hydroxytoluene or 2,6-di-tert-butyl-p-cresol)
12. Methyl methacrylate
13. Butyl acrylate
Epoxidized Soybean Oil (Jenkinol 680) from Acme-Hardesty in Blue Bell, Pa.
15. Zirconium Acetylacetonate
16. Isophorone diisocyanate
17. Epoxidized Linseed Oil (Plasthall ELO) available from Hallstar in Chicago, Ill.
18. Plutonic F68-LF a block copolymer of PEO-PPO available from BASF
19. Ethylenediamine
20. Erythrobic acid
21. Triethylamine
22. Adipic dihydrazide (ADH)
23. Hydrazine hydrate

Example 1

Poly-Ketone Polyol Synthesis

A poly-ketone functional oligomer from a renewable source was prepared by combining items 1-3 of the ingredients of Recipe 1 below in a 4 neck flask equipped with a thermometer, overhead stirrer and nitrogen gas inlet. With stirring and under a nitrogen blanket, the temperature of the reaction mixture was raised to 110° C.-114° C. and held at this temperature for 1 hour. The temperature was then raised to 123-126° C. and held at this temperature for about 3 hours where the acid number was measured as 0.7 (mg/g). The final material was clear with a dark amber color and a viscosity of ~350 cps at 70° C. at an acid number of 0.7 mg/g.

| Recipe 1 | | |
|---|---|---|
| Item # | Material | Parts |
| 1 | Epoxidized Soybean Oil (Plasthall ESO) | 270.0 |
| 2 | Levulinic Acid | 123.4 |
| 3 | 1,4-Diazabicyclo[2,2,2]octane (DABCO) | 2.5 |

Example 2

Polyurethane Dispersion Containing Poly-Ketone Polyol Prepared from Epoxidized Soybean Oil A prepolymer was prepared by combining items 1-2 of Recipe 2 of the ingredients below at 60° C. to a 4 neck flask equipped with a thermometer, overhead stirrer and gas inlet. The reaction was run under a stream of dry nitrogen introduced through the gas inlet on the reactor. The temperature of the reaction mixture was raised to 80° C. to 83° C. and held, at this temperature for 15 minutes or until the target weight percent NCO concentration of 12.575% was reached as indicated by titration of a small sample. At the same time, item 3-6 were homogenized together which appeared to give a solution of item 5 in 3, 4 and 6. The homogeneous mixture of items 3-6 was then added to items 1 and 2 after they reached the theoretical NCO % target at a temperature of 60° C. The temperature was controlled between at 63-68° C. for about 25 minutes or until the target NCO % was reached (5.574%) as indicated by titration of a small sample. After the prepolymer reached the theoretical NCO, the prepolymer was dispersed shortly afterwards as described below.

Recipe 2

| Item # | Material | Parts |
|---|---|---|
| 1 | Polyol from Example 1 | 207.9 |
| 2 | Di-cyclohexylmethane di-isocyanate | 129.6 |
| 3 | Santicizer 2148 | 42.1 |
| 4 | Proglyde DMM | 21.1 |
| 5 | Dimethylolpropionic acid | 20.5 |
| 6 | Triethylamine | 15.6 |

A polyurethane dispersion was prepared by dispersing the neutralized prepolymer (at 68-70° C.) in 578 parts water containing 5 parts sodium lauryl sulfate while controlling the water/dispersion temperature between 22-28° C. The dispersed prepolymer was extended with 11.8 g of hydrazine hydrate (35% hydrazine content) and 7 minutes afterwards with 31.0 parts of a 25% aqueous solution of ethylenediamine added over 5 minutes. This resulted in a 37.9% solids polyurethane dispersion with low sediment, a viscosity of 110 cps (at 25° C.) at a pH of 8.3 with a particle size of 58.8 nm. To 100 parts of the above dispersion 2.20 parts of adipic dihydrazide (ADH) was added to allow self-crosslinking between carbonyl/ketone groups in the final polymer. This provided a coating which cured rapidly at room temperature to provide very good resistance to mar, black heel mark, and isopropyl alcohol after a 24 hr dry/cure time.

Example 3

Poly-Ketone Polyol Synthesis

A poly-ketone functional polyol was prepared from a renewable source by combining items 1-3 of the ingredients of Recipe 3 in a 4 neck flask equipped with a thermometer, overhead stirrer and nitrogen gas inlet. With stirring and under a nitrogen blanket, the temperature of the reaction mixture was raised to 110° C. to 114° C. and held at this temperature for 1 hour. The temperature was then raised to 121-125° C. and held at this temperature for four hours or until the acid number was <1.0 (mg/g). The final material was clear with an emerald green tint and a viscosity of ~910 cps at 70° C. at an acid number of 1.0 mg/g.

Recipe 3

| Item # | Material | Parts |
|---|---|---|
| 1 | Epoxidized Soybean Oil (Plasthall ESO) | 300.0 |
| 2 | Levulinic Acid | 96.3 |
| 3 | Hycat 2000 (activated Cr3+ catalyst) | 2.0 |

Example 4

Polyurethane Dispersion Containing Poly-ketone Functional Polyol Prepared from Epoxidized Soybean Oil A prepolymer was prepared by combining items 1-2 of the ingredients in Recipe 4 at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 103° C. to 105° C. and held at this temperature for 90 minutes or until the target weight percent NCO concentration of 11.795% was reached as indicated by titration of a small sample. Item 3 was then added and the temperature adjusted to 72° C. to 75° C. where item 4 was then added. The temperature was then adjusted to 85-88° C. and held there for 1 hour or until the target NCO % was reached (4.816%) as indicated by titration of a small sample. After the prepolymer reached the theoretical NCO the prepolymer temperature was dropped to 68-70° C. and item 5 was added and homogenized into the prepolymer to neutralize (ionize) the prepolymer which is then dispersed shortly afterwards.

Recipe 4

| Item # | Material | Parts |
|---|---|---|
| 1 | Polyol from Example 3 | 182.9 |
| 2 | Di-cyclohexylmethane di-isocyanate | 141.2 |
| 3 | N-methylpyrrolidone | 61.6 |
| 4 | Dimethylolpropionic acid | 25.0 |
| 5 | Triethylamine | 19.2 |

About 386.6 g of the resulting neutralized prepolymer (at 68-70° C.) was dispersed in 540 g of water containing 0.5% Pluronic F68-LF surfactant versus prepolymer solids and having an initial temperature of 20-22° C. while maintaining the water/dispersion temperature below 28° C. The dispersed prepolymer was extended with 10.1 parts aqueous hydrazine hydrate solution (35% hydrazine content) and 5 minutes afterwards with 16.7 parts of a 25% aqueous solution of ethylenediamine. The resulting polyurethane dispersion was low in sediment with a solids level of 33.7%, a viscosity of 70 cps (at 25° C.) at a pH of 7.9 with a particle size of 51.7 nm.

To 100 g of the resulting dispersion (after no detectable NCO was observed via FTIR) 2.46 parts of adipic dihydrazide in 14.0 parts of warm (40-50° C.) water was added. Coatings of the dispersion containing the above concentration of ADH display excellent film formation and very good resistance to mar, black heel mark, and isopropyl alcohol after a 24 hr dry/cure time.

Example 5

Polyurethane-Acrylic Dispersion Containing Poly-ketone Polyol Prepared from Epoxidized Soybean Oil This example demonstrates how an NMP/cosolvent free urethane-acrylic hybrid could be prepared using similar raw materials that are employed in Example 3. A prepolymer was prepared by combining items 1-3 of the ingredients below at 60° C. to a 4 neck flask equipped with a thermometer, overhead stirrer and gas inlet. The reaction below was run under a stream of dry air introduced through the gas inlet on the reactor. The temperature of the reaction mixture was raised to 103° C. to 105° C. and held at this temperature for 90 minutes or until the targeted NCO % (11.795%) was reached as indicated by titration of a small sample. The temperature was then adjusted to 80-82° C. while adding items 4, 5 and 7 to the reactor. When the temperature reached 80-82° C. item 6 was added. The temperature was then brought to 85-88° C. and held there for 1 hour or until the target NCO % was reached (4.816%) as indicated by titration of a small sample. After the prepolymer reached the targeted NCO, the prepolymer temperature was dropped to 67-70° C. and item 8 was added and homogenized into the prepolymer to neutralize (ionize) the prepolymer which is then dispersed shortly afterwards.

| Recipe 5 | | |
|---|---|---|
| Item # | Material | Parts |
| 1 | Polyol from Example 3 | 184.1 |
| 2 | BHT | 0.3 |
| 3 | Di-cyclohexylmethane di-isocyanate | 142.0 |
| 4 | Methyl methacrylate | 82.8 |
| 5 | Butyl acrylate | 35.4 |
| 6 | Dimethylolbutanonic acid | 27.9 |
| 7 | BHT | 0.2 |
| 8 | Triethylamine | 19.3 |

A polyurethane dispersion was prepared by dispersing 450.1 g of the neutralized prepolymer into 520 g of water containing 0.5 Pluronic F68-LF surfactant versus prepolymer solids while maintaining the water/dispersion temperature below 28° C. The dispersed prepolymer was extended with 10.0 g of hydrazine hydrate (35% hydrazine content) and 5 minutes afterwards with 26.5 parts of a 25% aqueous solution of ethylenediamine. After allowing about 45 minutes for chain extension the temperature of the dispersion was adjusted to 33-35° C. and 0.3 parts of a 1% solution Fe-EDTA complex (pH>7.5) and 5.1 parts of aqueous 3.5% tert-butyl hydrogen peroxide is added followed by a slow addition of 6.5 parts of 2.0% aqueous erythorbic acid neutralized with triethylamine (pH>7.5). An exotherm resulted (~18° C.) indicating initiation and polymerization of the acrylic monomer present. This resulted in a 43.4% solids polyurethane dispersion with low sediment, a viscosity of 190 cps (at 25° C.) at a pH of 8.0 with a particle size of 114 nm.

To 100 parts of the above dispersion 2.34 parts of adipic dihydrazide (ADH) was added to provide self-crosslinking between carbonyl/ketone groups in the polyurethane acrylic composite. This provided a coating that cured rapidly at room temperature that exhibited excellent resistance to mar, black heel mark, and isopropyl alcohol after a 24 hr dry/cure time versus the same coating without ADH which has poor to fair resistance to mar, black heel mark, and isopropyl alcohol after a 24 hr dry/cure time.

Example 6

Poly-Ketone Polyol Synthesis

A poly-ketone functional polyol was prepared by combining items 1-3 of the ingredients below in a 4 neck flask equipped with a thermometer, overhead stirrer and nitrogen gas inlet. Item 3 was pre-dissolved in 3.78 parts of item 2 at 70° C. prior to adding to the other items. With stirring and under a nitrogen blanket, the temperature of the reaction mixture was raised and controlled between 110° C. to 114° C. and held at this temperature for 1 hour. The temperature was then raised to 121-125° C. and held at this temperature for four hours or until the acid number was <1.0 (mg/g). The final material was clear with a golden tint and a viscosity of ~590 cps at 70° C. at an acid number of 0.80 mg/g,

| Recipe 6 | | |
|---|---|---|
| Item # | Material | Parts |
| 1 | Epoxidized Soybean Oil (Jenkinol 680) | 201.1 |
| 2 | Levulinic Acid | 47.6 |
| 3 | Zirconium Acetylacetonate | 1.26 |

Example 7

Polyurethane Dispersion Containing Poly-Ketone Polyol Prepared from Epoxidized Soybean Oil A prepolymer was prepared by combining items 1-2 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 103° C. to 105° C. and held at this temperature for 90 minutes or until the target weight percent NCO concentration of 9.957% was reached as indicated by titration of a small sample. At the same time, item 3-6 were homogenized together which appeared to give a solution of item 5 in 3, 4 and 6. The homogeneous mixture of items 3-6 was then added to items 1 and 2 (after they reached the indicated theoretical NCO % target) at a temperature of 75° C. The temperature was held at 68-72° C. for 1 hour or until the target NCO % was reached (4.756%) as indicated by titration of a small sample. After the prepolymer reached the theoretical NCO, the prepolymer was dispersed shortly afterwards as described below.

| Recipe 7 | | |
|---|---|---|
| Item # | Material | Parts |
| 1 | Polyol from Example 6 | 207.9 |
| 2 | Di-cyclohexylmethane di-isocyanate | 129.6 |
| 3 | Santicizer 2148 | 42.1 |
| 4 | DMM | 21.1 |
| 5 | Dimethylolpropionic acid | 20.5 |
| 6 | Triethylamine | 15.6 |

A polyurethane dispersion was prepared by dispersing the neutralized prepolymer (at 68° C.) into water while controlling the water/dispersion temperature between 22-28° C. The dispersed prepolymer was extended with 17.9 g of hydrazine hydrate (35% hydrazine content) and 7 minutes afterwards with 8.2 parts of a 25% aqueous solution of ethylenediamine added over 5 minutes. This resulted in a 37.9% solids polyurethane dispersion with low sediment, a viscosity of 110 cps (at 25° C.) at a pH of 8.3 with a particle size of 58.8 nm.

To 100 parts of the above dispersion 2.20 parts of adipic dihydrazide (ADH) was added to allow self-crosslinking between carbonyl/ketone groups in the final polymer. This provided a coating which cured rapidly at room temperature to provide very good resistance to mar, black heel mark, and isopropyl alcohol after a 24 hr dry/cure time.

Example 8

Poly-Ketone Polyol Synthesis

A poly-ketone functional polyol was prepared by combining items 1-3 of the ingredients below in a 4 neck flask equipped with a thermometer, overhead stirrer and nitrogen gas inlet. Item 3 was pre-dissolved in 4.8 parts of item 2 at 70° C. prior to adding to the other items. With stirring and under a nitrogen blanket, the temperature of the reaction mixture was raised and controlled between 110° C. to 114° C. and held at this temperature for 1 hour. The temperature was then raised to 121-125° C. and held at this temperature for four hours or until the acid number was <1.0 (mg/g). The final material was clear with a golden tint and a viscosity of ~320 cps at 70° C. at an acid number of 0.70 mg/g.

Recipe 8

| Item # | Material | Parts |
|---|---|---|
| 1 | Epoxidized Soybean Oil (Plasthall ESO) | 277.4 |
| 2 | Levulinic Acid | 41.1 |
| 3 | Zirconium Acetylacetonate | 1.60 |

Example 9

Polyurethane Dispersion Containing Poly-Ketone Polyol Prepared from Epoxidized Soybean Oil A prepolymer was prepared by combining items 1-2 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 103° C. to 105° C. and held at this temperature for 90 minutes or until the target weight percent NCO concentration of 10.546% was reached as indicated by titration of a small sample. At the same time, item 3-6 were homogenized together which appeared to give a solution of item 5 in 3, 4 and 6. The homogeneous mixture of items 3-6 was then added to items 1 and 2 after they reached the theoretical NCO % target at a temperature of 75° C. The temperature was held at 68-72° C. for 1 hour or until the target NCO% was reached (4.756%) as indicated by titration of a small sample. After the prepolymer reached the theoretical NCO, the prepolymer was dispersed shortly afterwards as described below.

Recipe 9

| Item # | Material | Parts |
|---|---|---|
| 1 | Polyol from Example 8 | 207.9 |
| 2 | Isophorone diisocyanate | 129.6 |
| 3 | Santicizer 2148 | 42.1 |
| 4 | DMM | 21.1 |
| 5 | Dimethylolpropionic acid | 20.5 |
| 6 | Triethylamine | 15.6 |

A polyurethane dispersion was prepared by dispersing the neutralized prepolymer (at 70° C.) in water while controlling the water/dispersion temperature between 22-28° C. The dispersed prepolymer was extended with 17.9 g of hydrazine hydrate (35% hydrazine content) and 7 minutes afterwards with 8.2 parts of a 25% aqueous solution of ethylenediamine added over 5 minutes. This resulted in a 37.9% solids polyurethane dispersion with low sediment, a viscosity of 110 cps (at 25° C.) at a pH of 8.3 with a particle size of 58.8 nm.

To 100 parts of the above dispersion 2.20 parts of adipic dihydrazide (ADH) was added to allow self-crosslinking between carbonyl/ketone groups in the final polymer. This provided a coating which cured rapidly at room temperature to provide very good resistance to mar, black heel mark, and isopropyl alcohol after a 24 hr dry/cure time.

Example 10

Poly-Ketone Oligomer Synthesis

A poly-ketone functional polyol was prepared by combining items 1-3 of the ingredients below in a 4 neck flask equipped with a thermometer, overhead stirrer and nitrogen gas inlet. With stirring and under a nitrogen blanket, the temperature of the reaction mixture was raised and controlled between 110° C. to 114° C. and held at this temperature for 1 hour. The temperature was then raised to 121-125° C. and held at this temperature for four hours or until the acid number was <1.0 (mg/g). The final material was clear with an emerald green tint and a viscosity of ~3800 cps at 70° C. at an acid number of 0.8 mg/g.

Recipe 10

| Item # | Material | Parts |
|---|---|---|
| 1 | Epoxidized Linseed Oil (Plasthall ELO) | 270.0 |
| 2 | Levulinic Acid | 123.4 |
| 3 | Hycat 2000 (activated Cr3+ catalyst) | 1.9 |

Example 11

Polyurethane Dispersion Containing Poly-Ketone Functional Polyol Prepared from Epoxidized Soybean Oil and Poly-Ketone Oligomer A prepolymer was prepared by combining items 1-2 of the ingredients below at 60° C. to a 4 neck flask equipped with a thermometer, overhead stirrer and gas inlet. The reaction was run under a stream of dry nitrogen introduced through the gas inlet on the reactor. The temperature of the reaction mixture was raised to 103° C. to 105° C. and held at this temperature for 90 minutes or until the target weight percent NCO concentration of 11.795% was reached as indicated by titration of a small sample. Item was then added and the temperature adjusted to at 72° C. to 75° C. where item 4 was then added. The temperature was then adjusted to 85-88° C. and held there for 1 hour or until the target NCO % was reached (4.816%) as indicated by titration of a small sample. After the prepolymer reached the theoretical NCO the prepolymer temperature was dropped to 68-70° C. and item 5 was added and homogenized into the prepolymer (~10 minute mixing time). This was followed by addition of item 6 to neutralize (ionize) the prepolymer and blended in over a period of ~12 minutes which is then dispersed shortly afterwards.

Recipe 11

| Item # | Material | Parts |
|---|---|---|
| 1 | Polyol from Example 3 | 169.9 |
| 2 | Di-cyclohexylmethane di-isocyanate | 105.7 |
| 3 | N-methylpyrrolidone | 51.6 |
| 4 | Dimethylolpropionic acid | 16.7 |

-continued

Recipe 11

| Item # | Material | Parts |
|---|---|---|
| 5 | Poly-Ketone Oligomer from Example 10 | 19.2 |
| 6 | Triethylamine | 19.2 |

About 375.8 g of the resulting neutralized prepolymer (at 66° C.) was dispersed in 520 g of water containing 0.5% sodium lauryl sulphate surfactant versus prepolymer solids and having an initial temperature of 20-22° C. while maintaining the water/dispersion temperature below 28° C. The dispersed prepolymer was extended with 7.3 parts aqueous hydrazine, hydrate solution (35% hydrazine content) and 5 minutes afterwards with 19.2 parts of a 25% aqueous solution of ethylenediamine. The resulting polyurethane dispersion was low in sediment with a solids level of 35.4%, a viscosity of 40 cps (at 25° C.) at a pH of 8.3 with a particle size of 61.6 nm.

To 100 g of the resulting dispersion (after no detectable NCO was observed via FTIR) 3.62 parts of adipic dihydrazide, in 20.5 parts of warm (40-50° C.) water was added. Coatings of the dispersion containing the above concentration of ADH display excellent film formation and resistance to mar, black heel mark, and isopropyl alcohol after a 24 hr dry/cure time.

Example 12

Polyurethane Dispersion Containing Poly-Ketone Polyol Prepared from Epoxidized Soybean Oil A prepolymer was prepared by combining items 1-2 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 103° C. to 105° C. and held at this temperature for 90 minutes or until the target weight percent NCO concentration of 10.546% was reached as indicated by titration of a small sample. At the same time, item 3-6 were homogenized together which appeared to give a solution of item 5 in 3, 4 and 6. The homogeneous mixture of items 3-6 was then added to items 1 and 2 after they reached the theoretical NCO % target at a temperature of 75° C. The temperature was held at 68-72° C. for 1 hour or until the target NCO % was reached (5.292%) as indicated by titration of a small sample. After the prepolymer reached the theoretical NCO, the prepolymer was dispersed shortly afterwards as described below.

Recipe 12

| Item # | Material | Parts |
|---|---|---|
| 1 | Polyol from Example 6 | 218.5 |
| 2 | Isophorone diisocyanate | 115.3 |
| 3 | Santicizer 2148 | 41.6 |
| 4 | DMM | 20.8 |
| 5 | Dimethylolpropionic acid | 19.8 |
| 6 | Triethylamine | 15.1 |

A polyurethane dispersion was prepared by dispersing 397.6 g of the neutralized prepolymer (at a temperature of 58° C.) into 540 g of water while controlling the water/dispersion temperature between 22-28° C. The dispersed prepolymer was extended with 19.0 g of hydrazine hydrate (35% hydrazine content). This resulted in a 39.2% solids polyurethane dispersion with low sediment, a viscosity of 61 cps (at 25° C.) at a pH of 8.4 with a particle size of 83.9 nm.

To 100 parts of the above dispersion 2.48 parts of adipic dihydrazide (ADH) was added to allow self crosslinking between carbonyl/ketone groups in the final polymer. This provided a coating which cured rapidly at room temperature to provide very good resistance to mar, black heel mark, and isopropyl alcohol after a 24 hr dry/cure time.

Example 13

Polyurethane-Acrylic Dispersion Containing Poly-ketone Functional Polyol Prepared from Epoxidized Soybean Oil and Poly-Ketone Oligomer A prepolymer was prepared by combining items 1-3 of the ingredients below at 60° C. to a 4 neck flask equipped with a thermometer, overhead stirrer and gas inlet. The reaction was run under a stream of dry air introduced through the gas inlet on the reactor. The temperature of the reaction mixture was raised to 103° C. to 105° C. and held at this temperature for 90 minutes or until the target weight percent NCO concentration of 13.449% was reached as indicated by titration of a small sample. Item 4, 5, and 7 was then added and the temperature adjusted to at 72° C. to 75° C. where item 6 was then added. The temperature was then adjusted to 85-88° C. and held there for 1 hour or until the target NCO % was reached (6.205%) as indicated by titration of a small sample. After the prepolymer reached the theoretical NCO the prepolymer temperature was dropped to 68-70° C. and item 8 was added and homogenized into the prepolymer (~10 minute mixing time). This was followed by addition and of item 9 to neutralize (ionize) the prepolymer and blended in over a period of ~12 minutes which is then dispersed shortly afterwards.

Recipe 13

| Item # | Material | Parts |
|---|---|---|
| 1 | Polyol from Example 3 | 135.8 |
| 2 | BHT | 0.1 |
| 3 | Di-cyclohexylmethane di-isocyanate | 121.8 |
| 4 | Methyl methacrylate | 51.8 |
| 5 | Butyl acrylate | 41.8 |
| 6 | Dimethylolbutanonic acid | 20.6 |
| 7 | BHT | 0.1 |
| 8 | Poly-Ketone Oligomer from Example 10 | 92.8 |
| 9 | Triethylamine | 14.3 |

A polyurethane dispersion was prepared by dispersing 456.0 g of the neutralized prepolymer into 620 g of water containing 0.5% sodium lauryl sulphate surfactant versus prepolymer solids while maintaining the water/dispersion temperature below 28° C. The dispersed prepolymer was extended with 10.2 g of hydrazine hydrate (35% hydrazine content) and 5 minutes afterwards with 27.0 parts of a 25% aqueous solution of ethylenediamine. After allowing about 45 minutes for chain extension the temperature of the dispersion was adjusted to 33-35° C. and 0.3 parts of a 1% solution Fe-EDTA complex (pH>7.5) and 5.5 parts of aqueous 3.5% tert-butyl hydrogen peroxide is added followed by a slow addition of 7.0 parts of 2.0% aqueous erythorbic acid neutralized with triethylamine (pH>7.5). An exotherm resulted (~18° C.) indicating initiation and polymerization of the acrylic monomer present. This resulted in a 40% solids polyurethane dispersion with low sediment, a viscosity of 610 cps (at 25° C.) at a pH of 8.3 with a particle size of 122.7 nm.

To 100 puts of the above dispersion 2.87 parts of adipic dihydrazide (ADH) was added to provide self-crosslinking between carbonyl/ketone groups in the PUD. This provided a coating that cured rapidly at room temperature and exhibited excellent resistance to mar, black heel mark, and isopropyl alcohol after a 24 hr dry/cure time versus the same coating without ADH which has poor to fair resistance to mar, black heel mark, and isopropyl alcohol in the same cure time.

| Example Self-Crosslinking PUDs with High Renewable Resource Content | | | | | |
|---|---|---|---|---|---|
| Example # | pH | Viscosity (cps) | Solids (%) | Sediment (%) | Particle Size (nm) | MFFT, ° C. |
| 2 | 8.4 | 990 | 39.1 | 0.2 | 144.6 | <5 |
| 4 | 8.6 | 1480 | 36.2 | 0.0 | 118.3 | <5 |
| 5 | 8.0 | 69 | 44.4 | 0.1 | 106.5 | 35 |
| 7 | 8.3 | 46 | 38.6 | 0.4 | 58.8 | <5 |
| 9 | 8.1 | 38 | 38.9 | 0.3 | 100.8 | <5 |
| 11 | 8.3 | 40 | 35.4 | 0.0 | 61.4 | <5 |
| 12 | 8.4 | 61 | 39.2 | 0.2 | 83.9 | <5 |
| 13 | 8.3 | 610 | 40.0 | 0.0 | 122.7 | 7 |

Although only a few embodiments of this invention have been described above, it should be appreciated that many modifications can be made without departing from the spirit and scope of the invention. All such modifications can be included within the scope of the invention, which is to be limited only by the following claims. Patents cited for their teachings and enablements are hereby incorporated by reference.

The invention claimed is:

1. An aqueous polyurethane dispersion comprising at least one polyol obtained from the reaction of an epoxidized natural oil having an oxirane oxygen content of about 7 to 12% by weight with an organic acid forming a residue that is co-reacted with di or other polyisocyanates to form a portion of the polyurethane wherein said residue of said epoxidized natural oil is at least 20 wt. % of the polyurethane portion of the polyurethane dispersion.

2. An aqueous polyurethane dispersion according to claim 1, wherein said polyol is also co-reacted with a dispersing diol and/or a dispersing polyol.

3. An aqueous polyurethane dispersion according to claim 1, wherein said polyol contains reactive carbonyl groups derived from said organic acid.

4. An aqueous polyurethane dispersion according to claim 3 wherein the organic acid is either levulinic or pyruvic acid and that imparts ketone functionality to the resulting polyol derived from the epoxidized natural oil.

5. An aqueous polyurethane dispersion according to claim 3 wherein the epoxidized natural oil is either soybean or linseed oil.

6. An aqueous polyurethane dispersion according to claims 3, wherein the residue of said epoxidized natural oil is at least 30 wt. % of the polyurethane portion of said polyurethane dispersion.

7. An aqueous polyurethane dispersion according to claim 3, further comprising a hydrazine functional moiety capable of reacting with said carbonyl groups forming azomethine linkages.

8. An aqueous polyurethane dispersion according to claim 3, wherein an ethylenically unsaturated co-monomer(s) is added to said polyurethane, while said polyurethane was either in the form of a prepolymer or dispersion of the prepolymer in water, and thereafter said ethylenically unsaturated comonomer(s) is free radically polymerized to form a hybrid polymer of poly(vinyl monomer(s)) and polyurethane.

9. An aqueous polyurethane dispersion according to claim 1, further comprising at least one polyketone functional oligomer or polymer.

10. An aqueous polyurethane dispersion according to claim 9, wherein said polyketone oligomer is derived from the reaction of epoxidized natural oil with an organic acid.

11. An aqueous polyurethane dispersion according to claim 1, further comprising at least one vinyl polymer having ketone functional moiety(ies).

12. A coated substrate comprising a substrate and the aqueous polyurethane dispersion according to claim 1.

13. A coated substrate according to claim 12, wherein said substrate comprises cellulose or is wood.

* * * * *